United States Patent
Ruess et al.

(10) Patent No.: US 9,669,880 B2
(45) Date of Patent: Jun. 6, 2017

(54) STRUCTURAL COMPONENT FOR A BODY OF A PASSENGER CAR

(71) Applicant: AUDI AG, Ingolstadt (DE)

(72) Inventors: Marco Ruess, Mosbach (DE); Falk Biesdorf, Ittlingen (DE); Sebastian Kratt, Denkendorf (DE); Axel Kestler, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/991,412

(22) Filed: Jan. 8, 2016

(65) Prior Publication Data

US 2016/0200369 A1 Jul. 14, 2016

(30) Foreign Application Priority Data

Jan. 9, 2015 (DE) .......... 10 2015 100 263

(51) Int. Cl.
*B60J 7/00* (2006.01)
*B62D 29/00* (2006.01)
*B62D 25/04* (2006.01)
*B62D 65/02* (2006.01)
*B62D 25/02* (2006.01)
*B62D 27/02* (2006.01)

(52) U.S. Cl.
CPC .......... *B62D 29/00* (2013.01); *B62D 25/025* (2013.01); *B62D 25/04* (2013.01); *B62D 27/023* (2013.01); *B62D 29/007* (2013.01); *B62D 29/008* (2013.01); *B62D 65/024* (2013.01)

(58) Field of Classification Search
CPC ............ H01L 2924/00; H01L 2924/14; H01L 2224/45015; H01L 2224/48247; C09D 175/16; A61K 2300/00; A61K 38/21; C07H 19/06; C07H 19/10; C07H 19/20
USPC ................................ 296/193.06, 29
See application file for complete search history.

(56) References Cited

U.S. PATENT DOCUMENTS

| 4,982,994 A * | 1/1991 | Sekiguchi | B62D 25/087 296/203.03 |
| 5,066,066 A * | 11/1991 | Yurgevich | B62D 33/04 296/186.1 |
| 5,112,099 A * | 5/1992 | Yurgevich | B62D 33/04 296/186.1 |

(Continued)

FOREIGN PATENT DOCUMENTS

| DE | 19746165 | 4/1999 |
| DE | 199 39 977 | 1/2001 |

(Continued)

*Primary Examiner* — Kiran B Patel
(74) *Attorney, Agent, or Firm* — Henry M. Feiereisen LLC

(57) ABSTRACT

A structural component for a body of a passenger car includes a first component having a first material property, a second component having a second material property different from the first material property, and a third component arranged between the first component and the second component and having a first connection area with the first material property and a second connection area with the second material property. The third component is connected to the first component via the first connection area and to the second component via the second connection area, thereby attaching the first component to the second component by way of the third component.

6 Claims, 1 Drawing Sheet

(56) References Cited

U.S. PATENT DOCUMENTS

| | | | | |
|---|---|---|---|---|
| 6,648,401 B2* | 11/2003 | Behnke | | B62D 25/2036 296/198 |
| 7,083,224 B2* | 8/2006 | Yamamura | | B62D 25/163 296/187.09 |
| 7,121,615 B2* | 10/2006 | Hoshino | | B62D 25/06 296/187.12 |
| 7,578,547 B1* | 8/2009 | Mackay | | B60J 5/0451 296/181.1 |
| 8,162,388 B2* | 4/2012 | Balzer | | B62D 23/005 296/203.03 |
| 9,452,785 B2* | 9/2016 | Tsuneyama | | B62D 25/081 |
| 9,452,787 B2* | 9/2016 | Nakano | | B62D 25/04 |
| 9,452,788 B2* | 9/2016 | Anegawa | | B62D 25/04 |
| 2008/0170906 A1* | 7/2008 | Schmidt | | F16B 4/004 403/179 |
| 2010/0127532 A1* | 5/2010 | Hosaka | | B62D 25/07 296/193.06 |
| 2010/0187863 A1* | 7/2010 | Baumann | | B62D 25/04 296/193.06 |
| 2011/0101735 A1* | 5/2011 | Fujita | | B62D 21/152 296/193.06 |
| 2011/0163571 A1* | 7/2011 | Furusako | | B62D 25/06 296/193.06 |
| 2011/0227370 A1* | 9/2011 | Yasuda | | B60K 15/04 296/193.06 |
| 2011/0309657 A1* | 12/2011 | Hutter | | B62D 25/04 296/193.06 |
| 2012/0098297 A1* | 4/2012 | Kurokawa | | B62D 25/02 296/193.06 |
| 2012/0153676 A1* | 6/2012 | Shono | | B62D 25/04 296/193.06 |
| 2012/0242112 A1* | 9/2012 | Yamamoto | | B62D 25/06 296/193.06 |
| 2012/0274099 A1* | 11/2012 | Tamura | | B62D 25/04 296/193.06 |
| 2012/0299334 A1* | 11/2012 | Takayama | | B62D 25/02 296/193.06 |
| 2013/0113237 A1* | 5/2013 | Huhn | | B21D 53/88 296/193.05 |
| 2013/0193716 A1* | 8/2013 | Kurokawa | | B62D 25/06 296/193.06 |
| 2013/0257101 A1* | 10/2013 | Shono | | B62D 25/06 296/191 |
| 2013/0270853 A1* | 10/2013 | Ramoutar | | B62D 27/023 296/29 |
| 2013/0278017 A1* | 10/2013 | Arikai | | B62D 25/04 296/193.06 |
| 2013/0285414 A1* | 10/2013 | Alavandi | | B62D 25/04 296/193.06 |
| 2014/0015272 A1* | 1/2014 | Jaranson | | B62D 25/06 296/29 |
| 2014/0028056 A1* | 1/2014 | Nishimura | | B62D 25/04 296/193.06 |
| 2014/0054927 A1* | 2/2014 | Nakamura | | B62D 25/04 296/193.06 |
| 2014/0077529 A1* | 3/2014 | Kurokawa | | B62D 25/025 296/193.06 |
| 2014/0300139 A1* | 10/2014 | Torii | | B62D 25/04 296/187.12 |
| 2014/0319877 A1* | 10/2014 | Hida | | B62D 25/02 296/191 |
| 2014/0354012 A1* | 12/2014 | Nagai | | B62D 27/023 296/193.06 |
| 2015/0048654 A1* | 2/2015 | Eipper | | B62D 25/04 296/193.06 |
| 2015/0123429 A1* | 5/2015 | Watanabe | | B62D 25/04 296/193.06 |

FOREIGN PATENT DOCUMENTS

| | | |
|---|---|---|
| DE | 101 55 104 | 5/2003 |
| DE | 103 03 022 | 8/2004 |
| DE | 102004034817 | 2/2006 |
| DE | 102005006937 | 8/2006 |
| DE | 102006014988 | 10/2007 |
| DE | 102009035325 | 2/2011 |

* cited by examiner

STRUCTURAL COMPONENT FOR A BODY OF A PASSENGER CAR

CROSS-REFERENCES TO RELATED APPLICATIONS

This application claims the priority of German Patent Application, Serial No. 10 2015 100 263.9, filed Jan. 9, 2015, pursuant to 35 U.S.C. 119(a)-(d), the content of which is incorporated herein by reference in its entirety as if fully set forth herein.

BACKGROUND OF THE INVENTION

The invention relates to a structural component for a body of a passenger car, with a first component, a second component, and a third component arranged between the first component and the second component and connecting the first component to the second component.

It would be desirable and advantageous to obviate prior art shortcomings and to provide an improved structural component for use as a pillar component of a vehicle pillar of the body and as a longitudinal element, wherein the first component and the second component having the mutually different material properties can be particularly advantageous connected via the third component.

SUMMARY OF THE INVENTION

According to one aspect of the present invention, a structural component for a body of a passenger car has a first component having a first material property. The structural component further includes a second component having a second material property different from the first material property. In addition, the structural component has at least one third component disposed between the first component and the second component, with the first component being connected to the second component by way of the third component. In other words, the first component is connected to the second component through the intermediary of the third component.

To be able to particularly advantageously connect the first component and the second component having the mutually different material properties with each other by way of the third component, the third component may be connected with the first component via a first connection area where the third component has the first material property and may be connected with the second component via a second connection area where the third component has the second material property. In other words, according to the invention, the third component has a first connection area with the first material property and a second connection area with the second material property. The third component is hereby connected to the first component by way of the first connecting region and to the second component by way of the second connection area.

Since the first connection area has the same material property as the first component and the second connection area has the same material property as the second component, the third component can advantageously be connected to the first component and to the second component, especially in a time-saving and cost-effective manner. This connection is particularly secure and permanent, so that the first component is permanently connected to the second component through the intermediary of the third component in an especially advantageous, in particular in a particularly time-saving and cost-effective manner. The invention is based on the idea that components with different material properties can usually not be joined at all or only in a costly manner. Even when adapter elements are used for connecting to such components, such adapter elements usually have throughout a single material property which may be adapted to either the first material property or the second material property, but not to both material properties at the same time Thus, a compromise between the material properties of the components is usually required.

This compromise can now be avoided since, according to the invention, the third component acting, for example, as an adapter element has now two different material properties, namely, the first material property and the second material property. The third component can thus be connected in a particularly simple manner via the first connection area to the first component and via the second connection area to the second component. Joining or connection techniques adapted to the respective material property can be used for this purpose.

The underlying idea of the invention is, in particular, to select respective materials for the three components so that the different material properties permit a suitable joining technique in the connection areas. The third component may be contiguously formed of the same material. However, a connection to the first component and the second component can be produced by selecting a material with suitable material properties.

This idea is based on the observation that a material has not only exactly a single material property, but a combination of material properties such as chemical properties, physical properties, melting point, density, strength, chemical composition, etc.

The connection areas of the third component thus promote the gradation of properties, in particular material properties, so that the first component can be connected to the second component in a particularly advantageous manner. At the same time, different demands on the vehicle body can be satisfied by accordingly using the two different material properties. In particular, a so-called composite construction can hereby be realized.

In the context of the first material property, the first component and the first connecting region may have a first material thickness, whereas in the context of the second material property, the second component and the second connecting region may have a second material thickness different from the first material thickness. The components with the different material thicknesses can then be connected by way of the third component in a particularly advantageous manner. The structural component and thus the overall body can thus be designed as a composite construction, which allows at the same time optimization of the manufacturability and function of the body. By using the third component and due to its design, two components can be connected with one another by way of an intermediate component in the form of the third component, which can usually not be joined at all or only with great difficulty with conventional joining techniques. Moreover, it is possible to realize a smooth transition of the functional material properties, such as from high strength via normal to soft.

According to an advantageous feature of the present invention, the first component may be a pillar component of a vehicle pillar of the body and the second component may be a longitudinal element extending in the vehicle longitudinal direction to which the first component is connected via the third component. The longitudinal element may be, for example, a longitudinal beam, in particular a side sill, of the body of the passenger car. For example, the pillar component may be a weight-optimized aluminum component having a particularly lightweight design, whereas the second component may be a high-strength, functionally optimized steel component. The third component allows the formation of a particularly advantageous transition from the light, weight-optimized component to the high-strength, functionally optimized steel component, so that the aluminum component is supported on the steel component via the third component.

According to another advantageous feature of the present invention, the first component may have the first material property in a third connection area via which the first component is connected to the first connection area. In other words, the third connection area is preferably connected to the first connection area, wherein the third connection area has the first material property. The first component and the third component can then be advantageously connected with each other without, for example, having the employed joining technique for connecting the first component to the third component adversely affect the first material property.

According to another advantageous feature of the present invention, the second component may have the second material property in a fourth connection area, via which the second component is connected to the second connection area. In other words, the fourth connection area is preferably connected to the second connection area and has the second material property, so that the third component can particularly advantageously be connected to the second component. Here, a joining technique can be used for joining the third component with the second component that avoids unwanted degradation of the second material property.

According to another advantageous feature of the present invention, for realizing a particularly advantageous composite construction, the connection areas may be formed from mutually different materials. In other words, in this embodiment of the invention, the third component may have a mix of materials. In the context of this mix of materials, the connection areas of the third component may be formed from mutually different materials, so that the third component can be particularly advantageously connected to both the first component and the second component.

According to another advantageous feature of the present invention, the first material property is characterized in that the first component and the first connection area are formed of a first material, wherein the second material property is characterized in that the second component and the second connection area are formed from a second material different from the first material. For example, the materials may differ in their strength and/or rigidity. This makes it possible to meet different demands on the vehicle body, which can then be, for example, stiff or rigid in a first partial area and less stiff or less rigid than the first partial area in a second partial area different from the first partial area. In particular, the desired properties of the body can thus be specifically adjusted, so that the body has on the one hand, for example, an advantageous response and/or deformation behavior in an accident and, on the other hand, enables the realization of particularly advantageous driving characteristics of the passenger car.

According to another advantageous feature of the present invention, the first material property is characterized in that the first component and the first connection area are formed of a light metal. In this way, the structural component and thus the body of the passenger car can be kept particularly light-weight.

According to another advantageous feature of the present invention, the second material property is characterized in that the second component and the second connection area are formed of a high strength material, in particular high-strength steel. A high strength or stiffness can then be imparted on the structural component and thus on the overall body at least in a desired partial area, thereby protecting, for example, the occupants of the passenger car in an accident and also realizing advantageous handling characteristics of the passenger car.

Advantageously, the first material property may be characterized in that the first component and the first connection area are formed of a steel that is softer than high strength steel. In other words, the first component and the second component and thus the first connection area and the second connection area may each be formed from steel, wherein one of the steels is a high strength steel and the other steel is a steel with lesser strength than the one steel. In this way, different partial areas of the structural component and thus of the body can be adapted to different requirements, so that the body can be selectively provided with particularly advantageous properties.

According to another advantageous feature of the present invention, the first component may be connected to the first connection area by way of a first joining technique and the second component may be connected to the second connection area by way of a second joining technique different from the first joining technique. The respective joining techniques can thereby be adapted to the respective material properties, thereby avoiding undesirable degradation of the material properties caused by the joining techniques. For example, undesirable embrittlement and/or solidification processes during joining of the components can be avoided while at the same time realizing a stable and solid connection of the components. For example, when the components are formed from a metallic material, welding may be employed as the respective joining technique.

The pillar component is for example part of a C-pillar of the body, so that both a particularly good rigidity and a low weight of the body can be realized. In particular, a smooth transition of the material properties from high strength (longitudinal element) via normal to soft (pillar component) can be realized by using the third component.

The invention also includes a passenger car with a body having at least one structural component according to the invention. This means that the structural component is part of the body or of the shell of the passenger car. Advantages and advantageous embodiments of the structural component according to the invention are also to be regarded as advantages and advantageous embodiments of the passenger car according to the invention and vice versa.

Further advantages, features and details of the invention will become apparent from the following description of preferred embodiments and from the drawing. The features and feature combinations mentioned above in the description, and the features and feature combinations subsequently mentioned in the figure description and/or shown alone in figures can be used not only in the particular indicated combination, but can also be used in other combinations or alone, without departing from the scope of the invention.

DETAILED DESCRIPTION OF PREFERRED EMBODIMENTS

Figure 1:
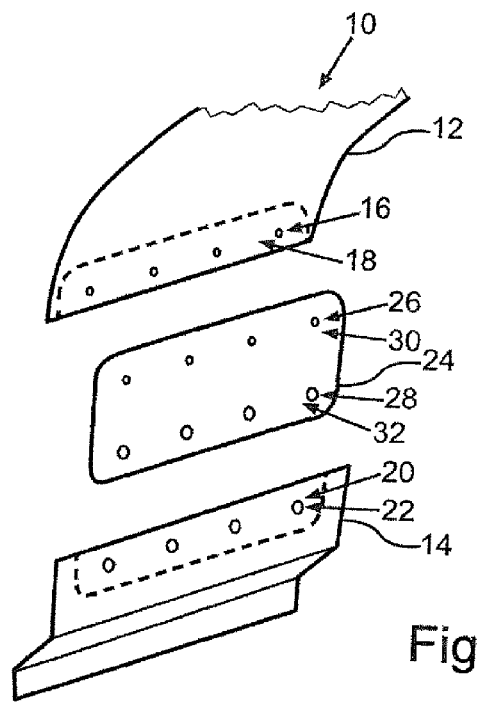
FIG. 1 a detail of a schematic and exploded perspective view of a structural component according to a first embodiment of a body of a passenger car, with a first component, a second component, and a third component via which the first component is connected to the second component, wherein the third component is connected to the first component via a first connection area in which the third component has a first material property and to the second component via a second connection area in which the third component has a second material property.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows in a schematic and exploded perspective view of a structural component 10 according to a first embodiment for a body of a passenger car. The structural component 10 includes a first component 12 that has at least one first material property. The first component 12 is for example a pillar component of a vehicle pillar of the body, wherein the vehicle pillar may be a C-pillar.

Furthermore, the structural component includes a second component 14 that is at least partially arranged in the vehicle vertical direction below the first component 12 and has at least one second material property different from the first material property. The first component 12 has the first material property at least in a partial area 16. The second component 14 has the second material property at least in a partial area 20.

The second component 14 is for example a longitudinal component extending at least substantially in the vehicle longitudinal direction x (FIG. 2), for example a component of a longitudinal beam, in particular the side sill, of the body. The structural component 10 also includes a third component 24 arranged at least partially between the first component 12 and the second component 14, wherein the first component 12 is connected to the second component 14 by way of the third component 24.

In order to realize a particularly advantageous connection of the first component 12 with the second component 14, the third component 24 is connected to the first component 12 via a first connection area 26 and to the second component 14 via a second connection area 28. The third component 24 has in this case the first material property in the first connection area 26, whereas the third component 24 has the second material property in the second connection area 28. Thus, the third component 24 has for example a mix of materials, wherein the third component 24 has the first material property in the first connection area 26 and in the connecting region 28 the second material property that is different from the first material property. The connection areas 26 and 28 may, for example, be formed of mutually different materials. These materials may be metallic materials. For example, the first connection area 26 is formed of a first material in the form of a first metallic material, whereas the second connection area 28 is formed of a second material in the form of a second metallic material that is different from the first material. The third component 24 may be configured as a tailored blank, i.e. as a customized plate.

Accordingly, for example the first component 12 is formed at least in the partial area 16 of the first material, whereas the second component 14 is formed at least in the partial area 20 of the second material. The partial area 16 is here a third connection area, via which the first component 12 is connected to the first connection area 26. In other words, the partial area 16 is connected to the connection area 26. The partial area 20 of the second component 14 is a fourth connection area, via which the second component 14 is connected to the second connection area 28. In other words, the connection area 28 is connected to the partial area 20.

To produce the structural component 10 and thus the overall body in composite construction, the first material is, for example, an aluminum material, so that the first component 12 is formed in lightweight construction. For example, the first component 12 is a light, weight-optimized aluminum component. The second material is, for example, high-strength steel, so that the second component 14 has high-strength properties as a second material property. The first component 12 constructed as an aluminum component has thus lightweight properties as a first material property. The second component 14 is then constructed, for example, as a high strength, functionally optimized steel component and stably connected to the first component 12 through the intermediary of the third component 24 in a particularly advantageous and particularly time-effective and cost-effective manner.

For realizing a particularly advantageous connection of the components 12 and 14, the partial area 16 is advantageously connected with the corresponding connection area 26 by a first joining technique, whereas the connection area 28 is connected with the corresponding partial area 20 by a second joining technique that is different from the first joining technique. The joining techniques are also referred to as connection techniques and can be adapted to the respective material properties, so as to reliably avoid unwanted adverse effects on the material properties caused by the joining techniques, while at the same time realizing a fixed connection of the components 12, 14 and 24. In FIG. 1, the respective joining techniques are illustrated by dots 18, 22, 30 and 32.

Figure 2:
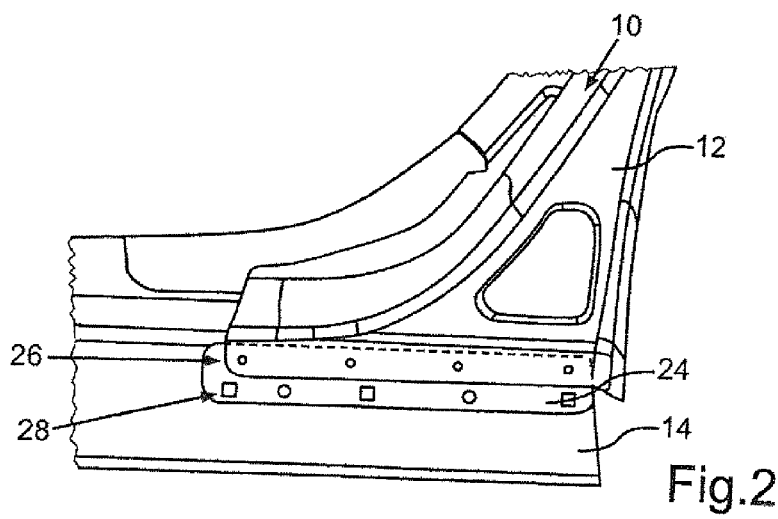
FIG. 2 a detail of a schematic side view of the structural component according to a second embodiment.

FIG. 2 shows the structural component 10 according to a second embodiment. In the second embodiment, the components 12, 14 and 24 are formed as sheet metal components, with the entire component 12 being formed, for example, from the first material and the entire component 14 being formed from the second material. FIG. 2 clearly shows that the first component is connected 12 to the second component 14 via the third component 24, wherein the first component 12 is supported on the second component 14 by way of the third component 24. By using the third component 24 with the connection areas 26 and 28, a particularly advantageous transition from the light, weight-optimized aluminum component in the form of the first component 12 to the high-strength, functionally optimized steel component in the form of the second component 14 can be provided.

The third component 24 is hereby an intermediate component which enables the connection of the parts 12 and 14 that usually cannot be connected at all or can be connected only with great difficulty with conventional joining techniques. Furthermore, a harmonious transition of the functional material properties from high strength (component 14) via normal to soft (component 12) can be created. The structural component 10 can thus be provided with a particularly high strength or rigidity in the area of the second component 14, and with a comparatively low strength or rigidity in the region of the component 12, so that different demands on the body can be met by using a composite construction.

In summary, it can be seen that the components 12 and 14 and thus the partial areas 16 and 20 can differ from one another, for example, in terms of their material qualities. Alternatively or additionally, the components 12 and 14 and thus the component areas 16 and 20 can differ from each other in their respective material thicknesses. The third component 24 can be used even with such different material thicknesses to connect the first component 12 to the second component 14 in a particularly advantageous manner.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A structural component for a body of a passenger car, comprising:

a sill extending in a vehicle longitudinal direction;

a vehicle pillar made of a material which is metallurgically softer than a material of the sill; and an adapter arranged between the sill and the vehicle pillar to attach the vehicle pillar to the sill, said adapter having a first connection area configured to correspond to the material vehicle pillar for attachment of the first connection area to the vehicle pillar, and a second connection area configured to correspond to the material of the sill for attachment of the second connection area to the sill.

2. The structural component of claim 1, wherein the first and second connection areas of the adapter are formed of mutually different materials.

3. The structural component of claim 1, wherein the vehicle pillar and the first connection area of the adapter are made of a metal.

4. The structural component of claim 3, wherein the metal is aluminum.

5. The structural component of claim 1, wherein the sill and the second connection area of the adapter are made of steel.

6. The structural component of claim 1, wherein the vehicle pillar is connected to the first connection area of the adapter by way of a first joining technique and the sill is connected to the second connection area of the adapter by way of a second joining technique that is different from the first joining technique.

* * * * *